United States Patent
Leu et al.

[11] Patent Number: 5,997,752
[45] Date of Patent: Dec. 7, 1999

[54] WATER TREATING APPARATUS FOR RAISING OXYGEN SOLUBILITY

[76] Inventors: Sheng-I Leu; Shun-Chen Chen; Sheng-Shih Cheng; Kuo-Chi Ko, all of P.O. Box 28-24, Kaohsiung, Taiwan

[21] Appl. No.: 08/722,317

[22] Filed: Sep. 27, 1996

[51] Int. Cl.$^6$ ........................................ C02F 1/36
[52] U.S. Cl. .............................. 210/760; 210/900
[58] Field of Search .................. 21/760, 192, 748, 21/900

[56] References Cited

U.S. PATENT DOCUMENTS

| | | | |
|---|---|---|---|
| 2,417,722 | 3/1947 | Wolff | 210/192 |
| 2,585,103 | 2/1952 | Fitzgerald | 210/748 |
| 2,717,874 | 9/1955 | Verain | 210/748 |
| 3,692,180 | 9/1972 | La Raus | 210/192 |
| 3,699,776 | 10/1972 | La Raus | 210/192 |
| 3,726,404 | 4/1973 | Troglione | 210/192 |
| 3,784,008 | 1/1974 | Troglione | 210/192 |
| 4,019,986 | 4/1977 | Burris et al. | 210/192 |
| 4,028,246 | 6/1977 | Lund et al. | 210/192 |
| 4,042,509 | 8/1977 | Bowen | 210/192 |
| 4,076,617 | 2/1978 | Bybel | 210/760 |
| 4,548,716 | 10/1985 | Boeve | 210/900 |
| 4,595,498 | 6/1986 | Cohen et al. | 210/192 |
| 4,599,166 | 7/1986 | Gesslauer | 210/192 |
| 4,619,763 | 10/1986 | O'Brien | 210/192 |
| 4,767,528 | 8/1988 | Saski et al. | 210/192 |
| 5,106,495 | 4/1992 | Hughes | 210/192 |
| 5,130,032 | 7/1992 | Sartori | 210/760 |
| 5,207,237 | 5/1993 | Langford | 134/102.1 |
| 5,259,972 | 11/1993 | Miyamaru et al. | 210/900 |
| 5,336,413 | 8/1994 | Van Staveren | 210/192 |
| 5,451,314 | 9/1995 | Neuenschwander | 210/192 |
| 5,531,908 | 7/1996 | Matsumoto et al. | 210/760 |
| 5,547,584 | 8/1996 | Capehart | 210/760 |

*Primary Examiner*—Cynthia L. Nessler
*Attorney, Agent, or Firm*—Bacon & Thomas

[57] ABSTRACT

A water treating apparatus for raising oxygen solubility in high-purity drinking water includes a high pressure pump for conveying high-purity drinking water treated by an R. O. treatment, or a U. F. treatment, or a distillation treatment, or a purity treatment into a closed container. An ozone injecter injects ozone in the drinking water conveyed by the high pressure pump. A cooler affixed around the closed container cools the water stored therein to a preset value. A supersonic vibrator stirs the stored drinking water so as to raise oxygen solubility in the drinking water stored in the closed container, and to prolong period of time for sterilization.

4 Claims, 5 Drawing Sheets

WATER TREATING APPARATUS FOR RAISING OXYGEN SOLUBILITY

BACKGROUND OF THE INVENTION

This invention concerns a water treating apparatus for raising oxygen solubility in high-purity drinking water, particularly able to raise oxygen solubility therein and prolonging period of time for sterilization.

A conventional comparatively improved drinking water treating process is shown in FIG. 1, which includes an oxidizing process by ozone for performing a first step of sterilization, purifying and deodorizing, a filtering process to remove oxidized substances, a soft-water treating process by resin, a deodorizing process by active carbon, and then a more sophisticated process of U. F. (ultra filter) treatment or R. O. (reverse osmosis) treatment (indispensable for high-purity drinking water), a cooling process, an ozone injecting process for mixing it in drinking water again to sterilize, purify and deodorize, stored, pressurized and then supplied to users.

However, In the process of injecting ozone and the storing process has been found a drawback that the ozone injected in drinking water can volatilize quite easily because of extremely active quality of ozone, and thus effect of keeping high oxygen solubility in drinking water and prolonging period of time for sterilization may be very low.

SUMMARY OF THE INVENTION

A main purpose of the present invention is to offer a water treating apparatus for raising oxygen solubility in drinking water and prolonging period of time for sterilizing.

The water treating apparatus for raising much oxygen in the present invention includes a high pressure pump for conveying forcibly high-purity drinking water treated in advance into a closed container, an ozone injecter for injecting dense ozone in the high-purity drinking water, a cooler for cooling down the drinking water stored in the closed container, and a supersonic vibrator for stirring the stored drinking water.

BRIEF DESCRIPTION OF DRAWINGS

This invention will be better understood by reference to the accompanying drawings, wherein.

DESCRIPTION OF THE PREFERRED EMBODIMENTS

Figure 3:
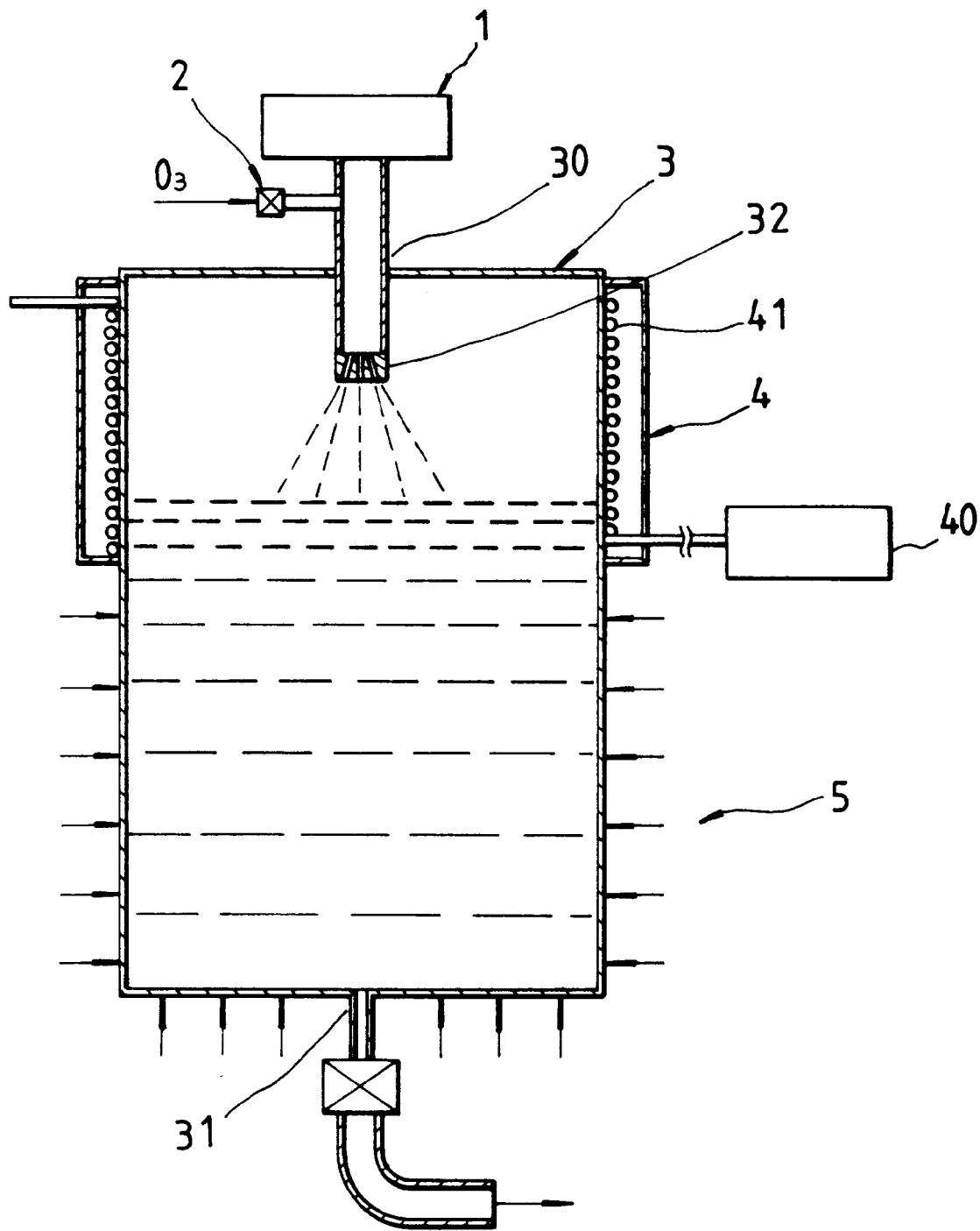
FIG. 3 is a cross-sectional view of a first preferred embodiment of the water treating apparatus for raising oxygen solubility in the present invention; and, FIG. 4 is a cross-sectional view of a second preferred embodiment of a water treating apparatus for raising oxygen solubility in the present invention.

A first embodiment of a water treating apparatus for raising oxygen solubility is shown in FIG. 3, including a high pressure pump 1, an ozone injecter 2, a closed container 3, a cooler 4, and a supersonic vibrator 5 combined together.

Figure 1:
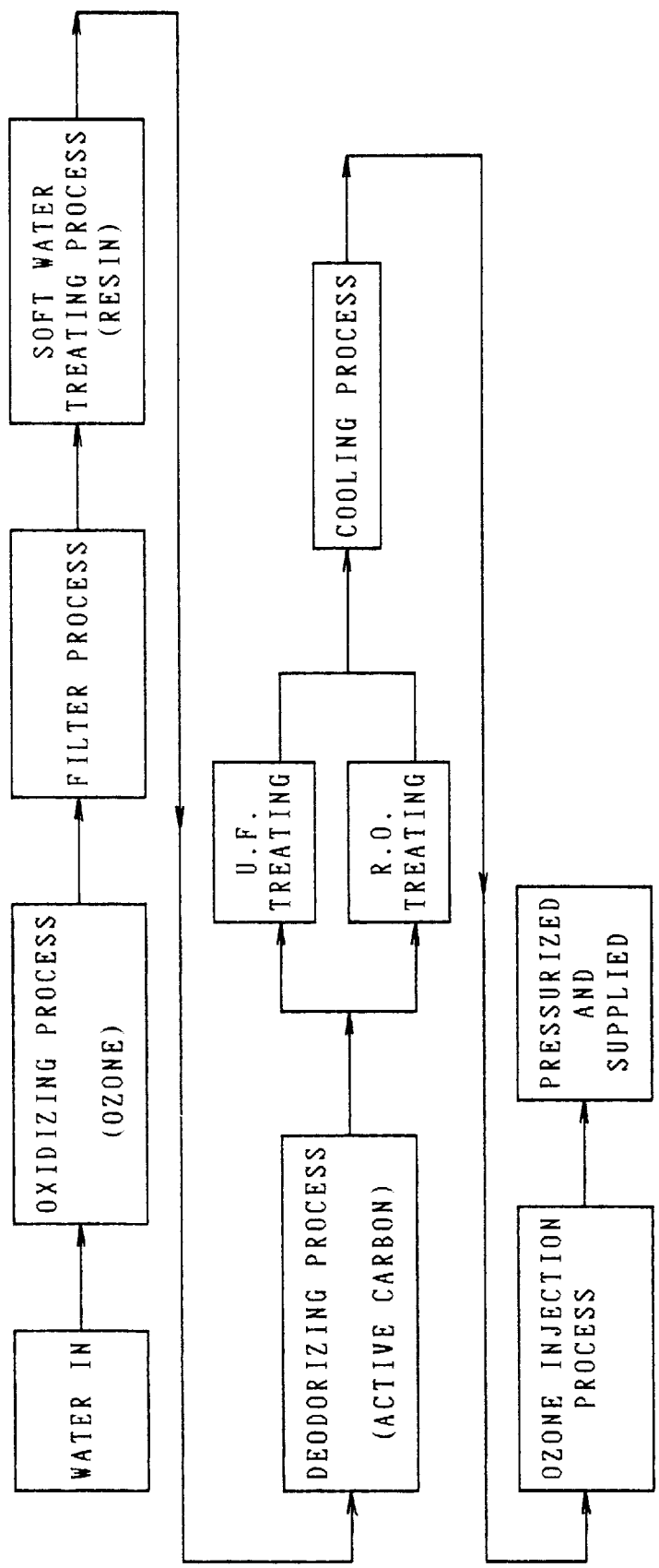
FIG. 1 is a flow chart of processes of a conventional drinking water treatment.
Figure 2:
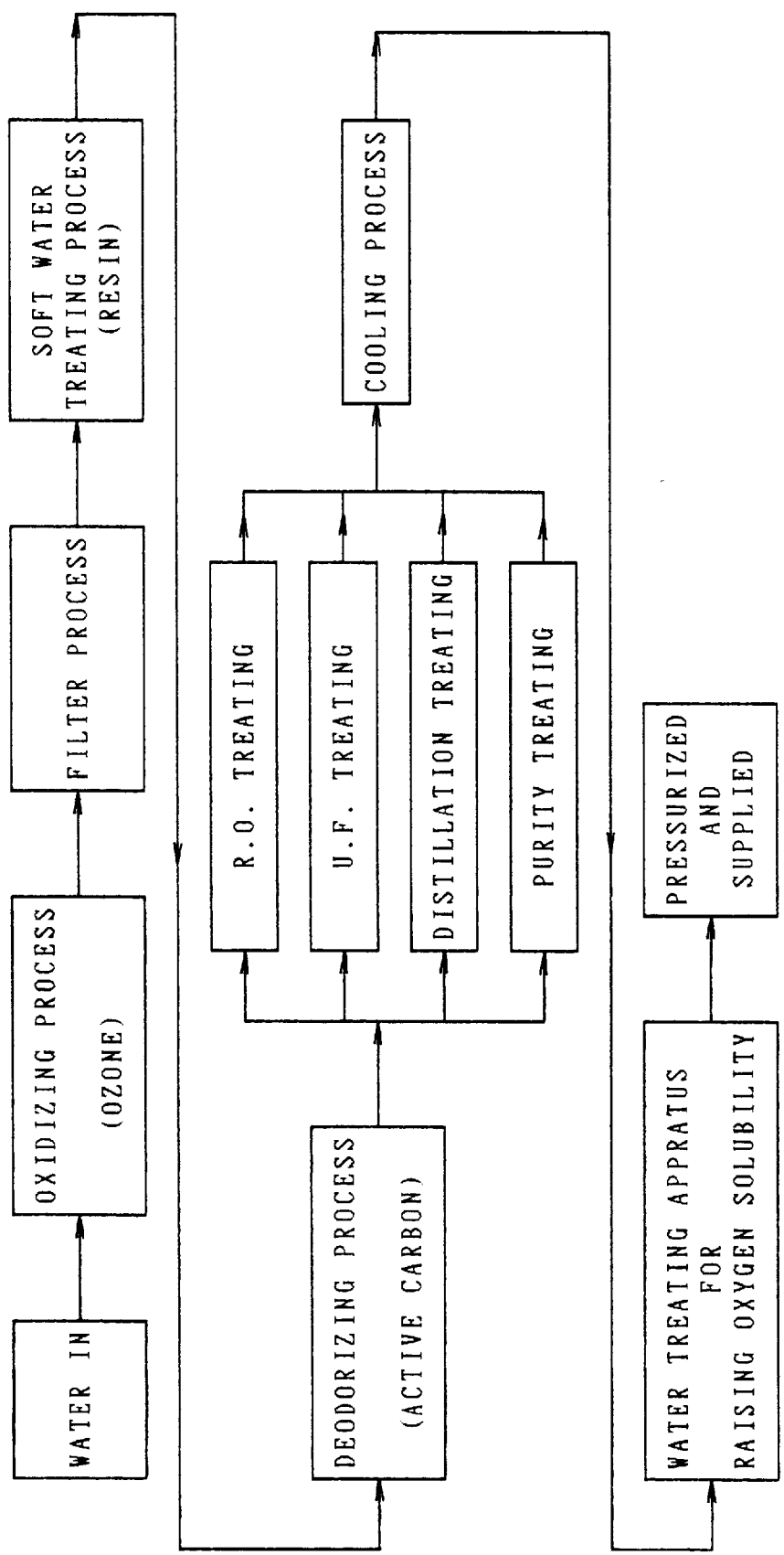
FIG. 2 is a flow chart of processes of a water treating apparatus for raising oxygen solubility in the present invention.

FIG. 2 shows processes performed by the water treating apparatus in the present invention, treating once again high-purity drinking water already treated in advance by the conventional drinking water treatment described above, wherein are included a reverse osmosis treatment (R. O. treatment), or an ultra filter treatment (U. F. treatment), or a distillation treatment or a purity treatment, etc., in order to raising oxygen solubility in the high-purity drinking water treated in the conventional processes and then to supply it with pressure so that the water supplied may contain high oxygen solubility, and sterilizing period of time may be prolonged. The R. O. treatment can remove at least 87 percent of ion, the ultra filter treatment can remove organic substances, the distillating process can remove inorganic substances, and the purifying process can remove cation or anion.

The high pressure pump 1 may have capacity of 3 $Kg/CM^2$–200 $Kg/CM^2$ for conveying forcibly high-purity drinking water properly treated in advance.

The ozone injecter 2 may have injecting capacity of 5 ppm–100 ppm per 1 ton in the water conveyed by the high pressure pump 1.

The closed container 3 has a proper size for receiving and storing the water conveyed by the high pressure pump 1, an interior kept at a preset special pressure, an inlet 30 and an outlet 31 for water to enter therein and to flow out.

The cooler 4 is affixed around the closed container 3 at a proper place, having a compressor 40 and a condenser 41 for cooling the drinking water stored in the closed container 3 to a preset low temperature by their freezing function.

The supersonic vibrator 5 is affixed with the closed container 3 at a proper place, used for stirring the water stored in the closed container 3 evenly so that ozone may be fused together water particles as if they were in emulsified condition, and thus be kept in the largest proportion to the water and for a long period of time as possible. In addition, the supersonic vibrator 5 can force ozone and water increase mutual percolating force, penetrating force, dispersing dimension and contacting dimension so as to truly stir ozone and water evenly.

In general, high-purity drinking water is conveyed by the high pressure pump 1, fused with ozone by the ozone injecter 2, flowing through the inlet 30 into the closed container 3, cooled and kept at a preset low temperature therein by the cooler 4, and then are vibrated and stirred to fuse together in an even condition, with mutual percolating force, penetrating force, dispersing dimension and contacting dimension increased, and attaining function of raising oxygen solubility in the drinking water, prolonging period of time for sterilization. Therefore, cleaner high-purity drinking water with high oxygen solubility can be obtained.

The interior pressure of the closed container 3 is depended on the percentage of oxygen contained in the drinking water, and not less than 3 $Kg/CM^2$. And this interior pressure has to be kept continually, otherwise, ozone injected in the drinking water may volatilize very quickly to flow out of the closed container 3, unable to remain therein for long so that the environment should be polluted to give bad influence to workers around. When ozone in the air should exceed 0.1 ppm, it will hurt respiratory organs of workers around, and if it exceeds 1 ppm, it will poison them.

The frequency of the supersonic wave is preferably in the scope of $1.5·10^5$–$6.0·10^5$, which may not increase the temperature of the water stored in the closed container 3.

The cooler 4 can preferably function to keep the water in the closed container 3 in the scope of temperature 1° C.–20° C., wherein ozone may fuse with water in the highest degree.

As to the inlet 30 of the closed container 3, a high-pressure nozzle 32 with many holes is preferably affixed with it additionally so as to increase most effectively contacting dimension of ozone with water and its emulsifying percentage. The diameter proportion of the inlet 30 to the outlet 31 is preferably 4 to 1 in order to keep the inner pressure of the closed container 3.

As described just above, the water treating apparatus for raising oxygen solubility in the present invention secures function of raising oxygen solubility in drinking water and prolonging period of time for sterilization and thus meeting demand for high-purity drinking water and preventing the environment from polluted by ozone escaping out of the drinking water during canning or tapped out. Besides, quality of a working environment and safety of workers are indirectly improved.

Figure 4:
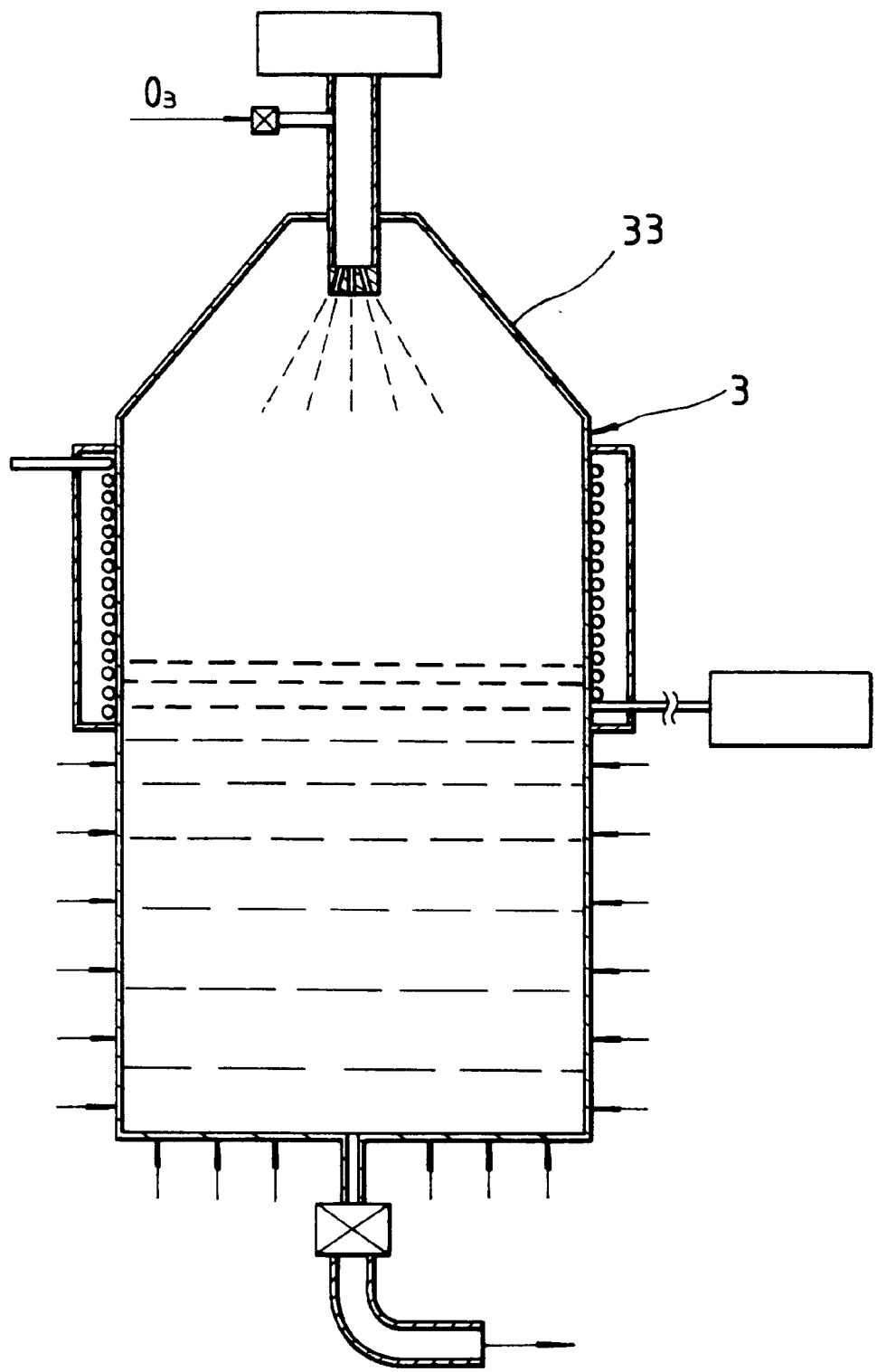

FIG. 4 shows a second preferred embodiment of a water treating apparatus for raising oxygen solubility, having the same structure as the first preferred embodiment, except the closed container 3, which has a cone-shaped upper portion 33 so as to guide drinking water coming in and to increase contacting dimension of ozone with water and oxygen fused in the drinking water.

Figure 5:
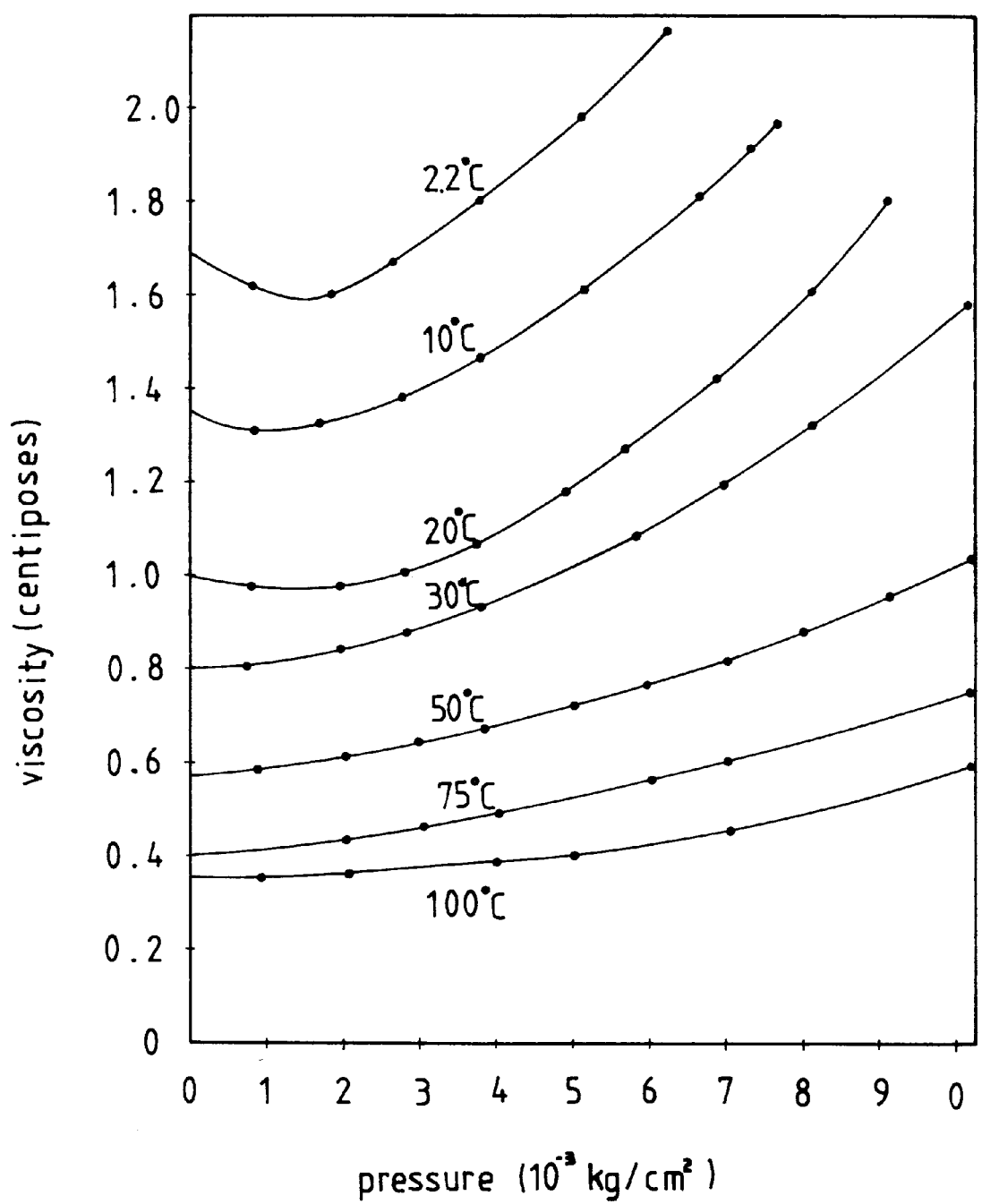
FIG. 5 is a graph of correlation of water viscosity and pressure.

As can be understood from FIG. 5, water viscosity is directly proportionate to pressure, and it means physically that the more pressure is, the larger water viscosity is, i. e. water cohesion becomes higher. Therefore, after water is stirred by the supersonic vibrator, with its particles being separated, the water particles can always pinch ozone powerfully by means of its high cohesion so as to create emulsified condition, and thus the sterilizing period of time by ozone can be prolonged. This is the reason to prove that this invention is usable either theoretically and practically.

While the preferred embodiment of the invention have been described above, it will be recognized and understood that various modifications may be made therein and the appended claims are intended to cover the spirit and scope of the invention.

What is claimed is:

1. A method for enhancing the solubility of ozone in water which comprises:

introducing water and ozone under pressure into a closed container, said closed container being maintained at a pressure of at least 3 $Kg/cm^2$;

cooling said pressurized water and ozone in said container to thereby raise the viscosity of said water; and vibrating said cooled water and ozone with a supersonic vibrator to mix said ozone in said water in which the viscosity has been raised.

2. The method of claim 1 which further comprises periodically removing at least a portion of the mixed water and ozone from said container and replacing said water and ozone removed from said container by introducing additional water and ozone under pressure into said container to maintain a pressure of at least 3 $Kg/cm^2$ in said chamber; cooling the contents of said container and vibrating said contents with said supersonic vibrator to mix said ozone in said water.

3. The method of claim 2 wherein the pressure in said container is maintained at 3 $Kg/cm^2$ to 200 $Kg/cm^2$.

4. The method of claim 3 wherein the water in said container is maintained at a temperature of from 1° C.–20° C.

* * * * *